A. O. TATE.
STORAGE BATTERY.
APPLICATION FILED FEB. 24, 1908.
940,288.
Patented Nov. 16, 1909.
2 SHEETS—SHEET 1.
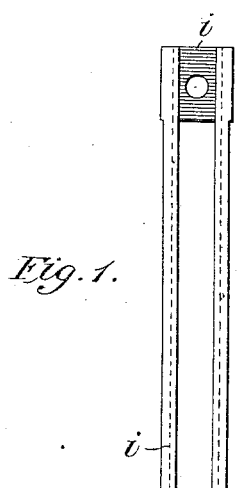
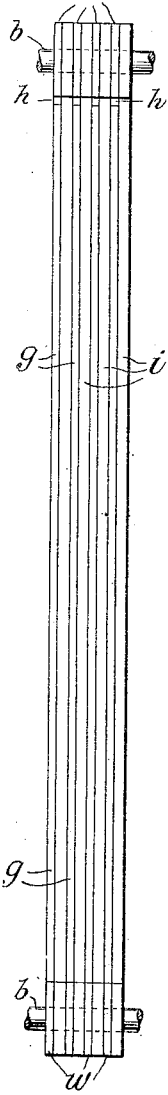
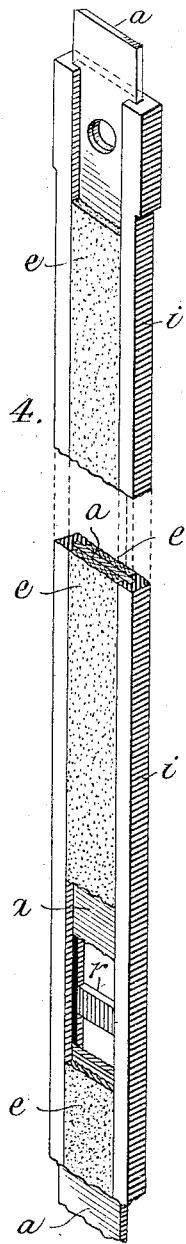
Witnesses:
Edward C. Rowland.
M. F. Keating.
Inventor
Alfred O. Tate
By his Attorney
Charles J. Kintner A. O. TATE.
STORAGE BATTERY.
APPLICATION FILED FEB. 24, 1908.
940,288.
Patented Nov. 16, 1909.
2 SHEETS—SHEET 2.
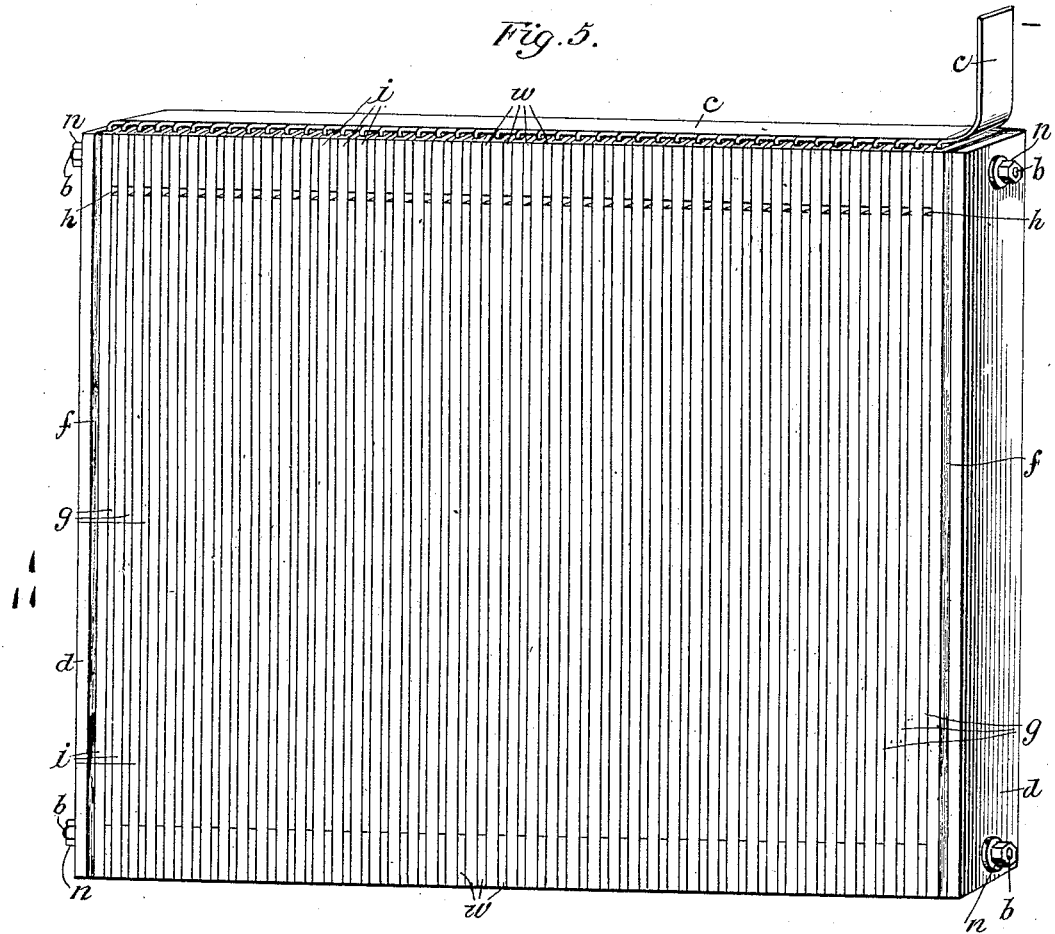
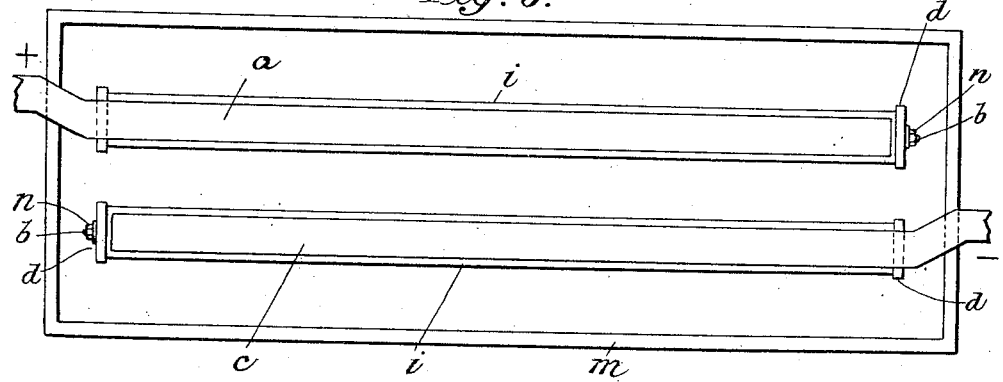
Witnesses:
Edward G. Rowland
M. F. Keating
Inventor
Alfred O. Tate
By his Attorney
Charles J. Kintner

UNITED STATES PATENT OFFICE.

ALFRED O. TATE, OF TORONTO, ONTARIO, CANADA, ASSIGNOR TO TATE ELECTROLYTIC COMPANY OF AMERICA, A CORPORATION OF NEW YORK.

STORAGE BATTERY.

940,288. Specification of Letters Patent. Patented Nov. 16, 1909.

Application filed February 24, 1908. Serial No. 417,314.

*To all whom it may concern:*

Be it known that I, ALFRED O. TATE, a subject of the King of Great Britain, and resident of the city of Toronto, Province of Ontario, Dominion of Canada, have made a new and useful Invention in Storage Batteries, of which the following is a specification.

My invention is directed particularly to an improvement upon a storage battery plate disclosed in a prior patent No. 880,422, granted to me by the U. S. Patent Office on the 25th day of February, 1908, in which patent I have described and claimed a novel form of what I term a "bifunctional" storage battery plate in which the anodes and cathodes of such plate are in the nature of interrelated or interleaved thin lead strips supported by insulating frames and all bound together, the anode strips being connected together at the top of the plate and the cathode strips at the bottom thereof, and the present invention has for its object generically the adaptation of this type of interrelated strips to a unifunctional use; that is to say, it consists in constructing a battery plate in which the anode strips are all bound in one plate in the manner disclosed in the beforementioned application and the cathode strips are similarly combined in an independent plate, so that each plate is capable of a unifunctional use as storage battery plates are ordinarily used.

My invention will be fully understood by referring to the accompanying drawings, in which, Figure 1 is a side elevational view of one of the supporting and insulating frames for each anode or cathode strip; Fig. 2 is an end view thereof as seen looking at Fig. 1 from the top toward the bottom of the drawings; Fig. 3 is a front elevational view of a portion of a completed plate with the parts assembled; Fig. 4 is an enlarged perspective view broken at the upper and lower portions thereof and broken away at the middle portion thereof to show the entire structure of one of the complete anode or cathode strips as assembled ready for the formation of a complete plate; Fig. 5 is a perspective view of a complete unifunctional plate embodying the present improvement, the same being the preferred form of structure designed for commercial use by me; Fig. 6 is a plan view of a storage battery cell embodying two of my novel unifunctional plates assembled therein and ready for use.

Referring now to the drawings in detail in which all letters of reference represent like or equivalent parts wherever used, and first to Figs. 1 to 4 inclusive, $i$ represents an open supporting and insulating frame for any one of the strip or ribbon like anodes or cathodes, this frame being composed preferably of hard rubber, vegetable fiber or any equivalent insulating medium of sufficient strength and flexibility to answer the purpose. I prefer to use hard rubber and in the construction of these frames they are stamped out bodily from a sheet of the material in such manner as to give the conformation shown in Fig. 1 of the drawings with enlarged squared ends and holes or openings therethrough and a central rib $r$. After being thus stamped out one face of each end is milled out to the same width as the slot like openings between said ends and the rib $r$, and said rib is also milled out, the portions milled out representing a depth say of $\frac{3}{32}$ of an inch in each instance, the entire thickness of the supporting and insulating frame being $\frac{3}{32}$ of an inch; the length thereof 8 inches; the width $\frac{1}{2}$ an inch and the width of the openings between the ends and the rib $r$ being $\frac{5}{8}$ of an inch. These proportions are of sufficient size for the parts of a full sized plate, but may be varied, if desired. After the milling is effected I pass a rotary grooving tool through the slotted openings in the direction of the length of the frame so as to cut out grooves in the inner faces thereof, as shown in dotted lines Fig. 1, and as shown in end view Fig. 2; these grooves constituting the points of support for the strips or ribbons, as will now be described, reference being had to Fig. 4 of the drawings.

$a$ represents one of such strips or ribbons which is of such width as to fit snugly when drawn into the grooves just described, and in this connection I may state that I prefer to place in said grooves, before the strip is drawn in to its extreme limit, a liquid insulating and sealing medium, such as liquid asphalt or any insulating liquid which will effectually seal and secure the edges of the strip to the inner surfaces of the grooves and thus protect it more effectually from the attacks of the electrolyte. When this ribbon is drawn in to the full extent one face thereof rests flat against the milled surfaces at the opposite ends of the frame and of the intermediate rib $r$ and these surfaces may also be coated with the before-mentioned insulating liquid medium, all in such a way that when put together in the manner described there is formed a frame and ribbon support of remarkable flexibility, strength and durability. When the strips are thus drawn in to their complete limit holes are provided in each end which correspond to the holes in the ends of the supporting frame, and after the strips are secured in the manner described the active material $e$ is applied in the nature of very thin coatings or films on both sides of the strip $a$, as shown; the coating represented in Fig. 4 of the drawings being very much exaggerated, said coating, however, being flush with the faces of both sides of the frame $i$.

Referring now to Fig. 3 of the drawings I will describe the manner of assembling the parts of the entire plate. $i$, $i$ represent as before the individual supporting and insulating frames and $g$, $g$, a series of intermediate interleaved porous strips preferably of kaolin and of the same width as the frames $i$, $i$, the thickness of said strips being preferably $\frac{1}{16}$ of an inch. $w$, $w$, represent square shaped insulating washers for spacing the anode or cathode strips, said washers being of the same rectangular dimensions as the squared ends of the supporting frames $i$, $i$. $b$, $b$, are insulating supporting rods adapted to be passed through the openings at the opposite ends of the supporting frames $i$, $i$, and anode or cathode strips or ribbons $a$, $a$.

It will be noted on examination of Fig. 4 of the drawings that the upper end of one of the anode or cathode strips, as shown, extends above the upper end of the supporting frame, so that when the several parts are assembled all of those conducting ribbons or strips which constitute the anodes or cathodes at the upper end of the plate are bent over so as to come into good electrical contact with each other and are then lead brazed together, the several strips when thus brazed together constituting the anode poles $a$, $a$, or cathode poles $c$, $c$, of the plate.

After being assembled on the insulating supporting rods $b$, $b$, which also support flexible cushion strips $f$, $f$, of rubber, and binding plates $d$, $d$, at their opposite ends they are firmly secured by nuts $n$, $n$, $n$, $n$, so as to thereby constitute in effect one integral plate in which the admission of the electrolyte to the active material is always through the lateral edges of the insulating porous strips $g$, $g$, and in this connection I may state that for the purpose of affording more free admission of the electrolytic solution I prefer to nurl in a direction cross-wise of their length the side faces of the supporting and insulating frame $i$, $i$, against which the porous strips $g$, $g$, rest. The lower ends of the porous strips $g$, $g$, rest upon the lower squared washers $w$, and said strips are of such length that their upper ends are separated in each instance from the lower edges of the upper squared washers $w$, $w$, to a sufficient extent to leave vents or openings $h$, $h$, so as to thereby afford free egress for the gases generated.

The structure as so far described is identically like that disclosed in Figs. 1 to 4 inclusive of the drawings of the before-mentioned patent in which, as before stated, the structural electrode plate when assembled is of a bifunctional nature. In the present invention I have assembled all of the anode strips $a$, $a$, in this manner in one complete plate, as shown in Fig. 5 of the drawings, so as to constitute what I term a unifunctional plate, and all of the cathode strips $c$, $c$, are similarly assembled so as to constitute a second or independent unifunctional plate, after which the two plates as thus constructed are assembled in the manner shown in Fig. 6 of the drawings, where $m$ is the containing cell, the anode plate in this instance being the upper one and the cathode plate the lower one as indicated respectively on the left and right by the $+$ and $-$ signs in the usual way.

I have ascertained that a battery plate as thus constructed possesses relatively large active surface and that when two or more of these plates are assembled in the manner described, relatively close to each other in a cell, materially valuable results are attained.

My invention contemplates generically a unifunctional storage battery plate made up of anode or cathode strips relatively closely allied with each other and separated by insulating media which permits of the free access of the electrolyte, the lateral edges of such strips being insulated from the electrolyte and the entire arrangement such that the action of the plate both in charging and discharging is through or upon the adjacent faces of the strips only; (whether the same be of a Planté or Fauré type), two such plates constituting one complete cell, as shown in Fig. 6 of the drawings.

In prior patents, as follows, Nos. 880,420; 880,421; 880,423; 880,424 and 880,425, granted to me by the U. S. Patent Office on the 25th day of February, 1908, bifunctional storage battery plates in which various dispositions of anode and cathode strips and means for insulating the same from the electrolyte are shown and described.

My present improvement contemplates a unifunctional arrangement of all of the modified forms of inventions disclosed in the before-mentioned patents and in a manner which will be understood by those skilled in the art, in view of the preceding description.

Having thus described my invention what I claim and desire to secure by Letters Patent of the United States is—

1. A unifunctional storage battery plate embracing a series of thin narrow conducting strips all connected together electrically at one end and separated from each other by porous insulating material, all such conducting strips being insulated at their lateral edges from the electrolyte, substantially as described.

2. A unifunctional storage battery plate embracing a series of thin narrow conducting strips all connected together electrically at one end and separated by similar strips of porous insulating material, all such conducting strips being insulated at their lateral edges from the electrolyte, substantially as described.

3. A unifunctional storage battery plate embracing a series of relatively thin narrow lead strips all connected together electrically at one end and separated from each other by like strips of porous insulating material, all such lead strips being insulated at their lateral edges from the electrolyte, substantially as described.

4. A unifunctional storage battery plate embracing a series of conducting strips all connected together at one end and separated from each other by relatively thin strips of porous insulating material; in combination with means for binding them all together, all such conducting strips being insulated at their lateral edges from the electrolyte, substantially as described.

5. A unifunctional storage battery plate embracing a series of strip or ribbon like conductors all connected together electrically and separated from each other by porous insulating strips of like form; in combination with cushion strips and binding plates, said ribbon like conductors being all insulated at their lateral edges from the electrolyte, substantially as described.

6. A unifunctional storage battery plate embracing parallel conducting strips all connected together electrically and separated from each other by porous insulating material, the conducting strips being insulated from the electrolyte at their lateral edges, the arrangement being such that relatively large surfaces are maintained, substantially as described.

7. A unifunctional storage battery plate embracing a series of conducting strips connected together electrically and separated from each other by thin porous insulating strips, the edges of said strips being located in the lateral faces of the plate and all of the conducting strips insulated at their lateral edges from the electrolyte, substantially as described.

8. A unifunctional storage battery plate embracing a series of thin narrow conducting strips each sustained by an independent insulating frame and all connected together at one end, the arrangement being such that the edges of the strips are located substantially in the side faces of the plate, substantially as described.

9. A storage battery embracing two unifunctional plates each having a series of conducting strips or ribbons separated from each other by porous insulating strips, all of the conducting strips of each plate being electrically connected together and insulated at their lateral edges from the electrolyte, and the two plates so located when in use that the edges of the strips of both plates are in relatively close parallelism, substantially as described.

10. A storage battery embracing two unifunctional plates composed each of conducting strips separated by porous insulating material, the lateral edges of said conducting strips being insulated from the electrolyte and each set of such strips connected to an independent conductor, said plates constituting respectively the anode and cathode of the battery, substantially as described.

In testimony whereof I have signed my name to this specification in the presence of two subscribing witnesses.

ALFRED O. TATE.

Witnesses:
C. J. KINTNER,
M. F. KEATING.